(12) United States Patent
Chang et al.

(10) Patent No.: US 7,730,239 B2
(45) Date of Patent: Jun. 1, 2010

(54) DATA BUFFER MANAGEMENT IN A RESOURCE LIMITED ENVIRONMENT

(75) Inventors: Naichih Chang, Shrewsbury, MA (US); Pak-Lung Seto, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 11/474,013

(22) Filed: Jun. 23, 2006

(65) Prior Publication Data

US 2008/0126623 A1     May 29, 2008

(51) Int. Cl.
*G06F 3/00*     (2006.01)
(52) U.S. Cl. ........................................ 710/53
(58) Field of Classification Search ..................... 710/53
See application file for complete search history.

(56) References Cited

U.S. PATENT DOCUMENTS

| | | | | |
|---|---|---|---|---|
| 5,432,908 A | * | 7/1995 | Heddes et al. | 711/147 |
| 5,802,546 A | * | 9/1998 | Chisholm et al. | 711/100 |
| 5,870,627 A | * | 2/1999 | O'Toole et al. | 710/22 |
| 5,931,920 A | * | 8/1999 | Ghaffari et al. | 710/5 |
| 6,094,434 A | * | 7/2000 | Kotzur et al. | 370/401 |
| 6,952,797 B1 | * | 10/2005 | Kahn et al. | 714/770 |

OTHER PUBLICATIONS

INCITS, Working Draft American National Standard, "Information tech.—Serial Attached SCSI (SAS)", Project T10/1562-D, Rev. 5, Jul. 9, 2003, pp. 262-292 (sections 9.1 & 9.2).

* cited by examiner

*Primary Examiner*—Henry W. H. Tsai
*Assistant Examiner*—Juanito C Borromeo
(74) *Attorney, Agent, or Firm*—Christopher K. Gagne

(57) ABSTRACT

An apparatus and method is provided to facilitate Input/Output (I/O) transfer in resource limited storage environment. Scatter gather list, segment and memory data buffer allocation are dynamically managed. I/O transfer performance is increased through the use of a data cut-through buffer mechanism.

18 Claims, 5 Drawing Sheets

DATA BUFFER MANAGEMENT IN A RESOURCE LIMITED ENVIRONMENT

FIELD

This disclosure relates to management of data buffers and in particular to management of data buffers in a resource limited environment.

BACKGROUND

Typically blocks of memory (data buffers) are pre-allocated for transferring data between applications. The data can be gathered from, or scattered into, a set of data buffers with the pre-allocated set of data buffers being identified through the use of a Scatter-Gather List (SGL). Each entry in the SGL is capable of storing an Address-Length (A/L) pair that identifies a data buffer. A start address for a data buffer is stored in an address field (A) of the A/L pair and the length of the data buffer is stored in a length field (L) of the (A/L) pair typically by application software or device drivers in an operating system.

Typically, all of the memory resources required for an Input/Output (I/O) transfer are allocated before the I/O transfer starts. An I/O transfer refers to a movement of data between data buffers in system memory and a device. In an environment with limited memory resources, such as embedded systems having programs stored in non-volatile memory such as Read Only Memory (ROM) or flash memory, instead of sending all of the data for the I/O transfer in a large single I/O transfer, the data to be transferred may be split up into a plurality of small I/O transfers with the plurality of I/O transfers being performed in linear order. However, splitting the large I/O transfer into a set of smaller I/O transfers reduces overall performance of the large I/O transfer due to the additional overhead required to set up the smaller I/O transfers.

For I/O transfers between initiators and targets in a storage environment, each target includes a queue for storing pending tasks that include I/O transfers. The initiator monitors 'queue depth' information provided by the target to determine if the target can accept a new task. For example, in a system in which each task includes one I/O transfer, a target with a queue depth of 8 is capable of currently processing 8 different I/O transfers. If a large I/O transfer is split into a plurality of smaller I/O transfers, optimal resource utilization is not provided because all of the target's resources for I/O transfers may be used for the single large I/O transfer having the many smaller I/O transfers instead of different I/O transfers.

To increase resource utilization, instead of splitting a large I/O transfer into a plurality of smaller I/O transfers, I/O processing for the large I/O transfer is stalled until a resource is released. When the released resource is allocated to the I/O transfer, the I/O transfer is resumed. Although this method does not have the additional overhead to set up many-small-I/O transfers, however, performance is reduced because stalling I/O transfers requires additional Central Processing Unit (CPU) processing cycles.

Also, when an I/O transfer is stalled, the progress of other I/O transfers may be blocked. For example, the blocked I/O transfers may have a resource/buffer available for use by another I/O but because they are blocked they are unable to release the resource/buffer. Blocked I/O transfers typically occur in applications involving serial storage protocols because of the flow control nature of serial storage protocols.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

An embodiment of the invention will be described for the Serial Attached Small Computer System Interface (SAS)—Serial Storage Protocol (SSP). A version of the SAS-SSP protocol is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by ANSI (hereinafter termed the "SAS Standard").

However, the invention is not limited to SAS-SSP. An embodiment of the invention may also be used for other serial storage protocols such as Fibre Channel. A version of the Fibre Channel (FC) standard is described in the American National Standards Institute (ANSI) Standard Fibre Channel Physical and Signaling Interface—2 (FC-FS-2) Aug. 9, 2005 Specification. A version of the Fibre Channel Protocol (FCP-3) standard which defines a mapping protocol for applying the Small Computer System Interface (SCSI) command set to Fibre Channel is described in Information technology—Fibre Channel Protocol for SCSI, Third Version (FCP-3) Revision 4, Sep. 13, 2005 American National Standards Institute (ANSI) (hereinafter termed the "FCP standard").

A SAS environment typically includes a plurality of ports which may be initiator ports, target ports or initiator/target ports. An initiator port originates device service and task management requests to be processed by target ports and receives device service requests and task management responses from target ports. For example, an initiator port may originate a request for an Input/Output (I/O) transfer to/from a target device. An I/O transfer refers to a movement of data between data buffers in system memory and a device. The direction of the I/O transfer may be target/initiator inbound (into the target or initiator port) or target/initiator outbound (out of the target or initiator port).

Figure 1:
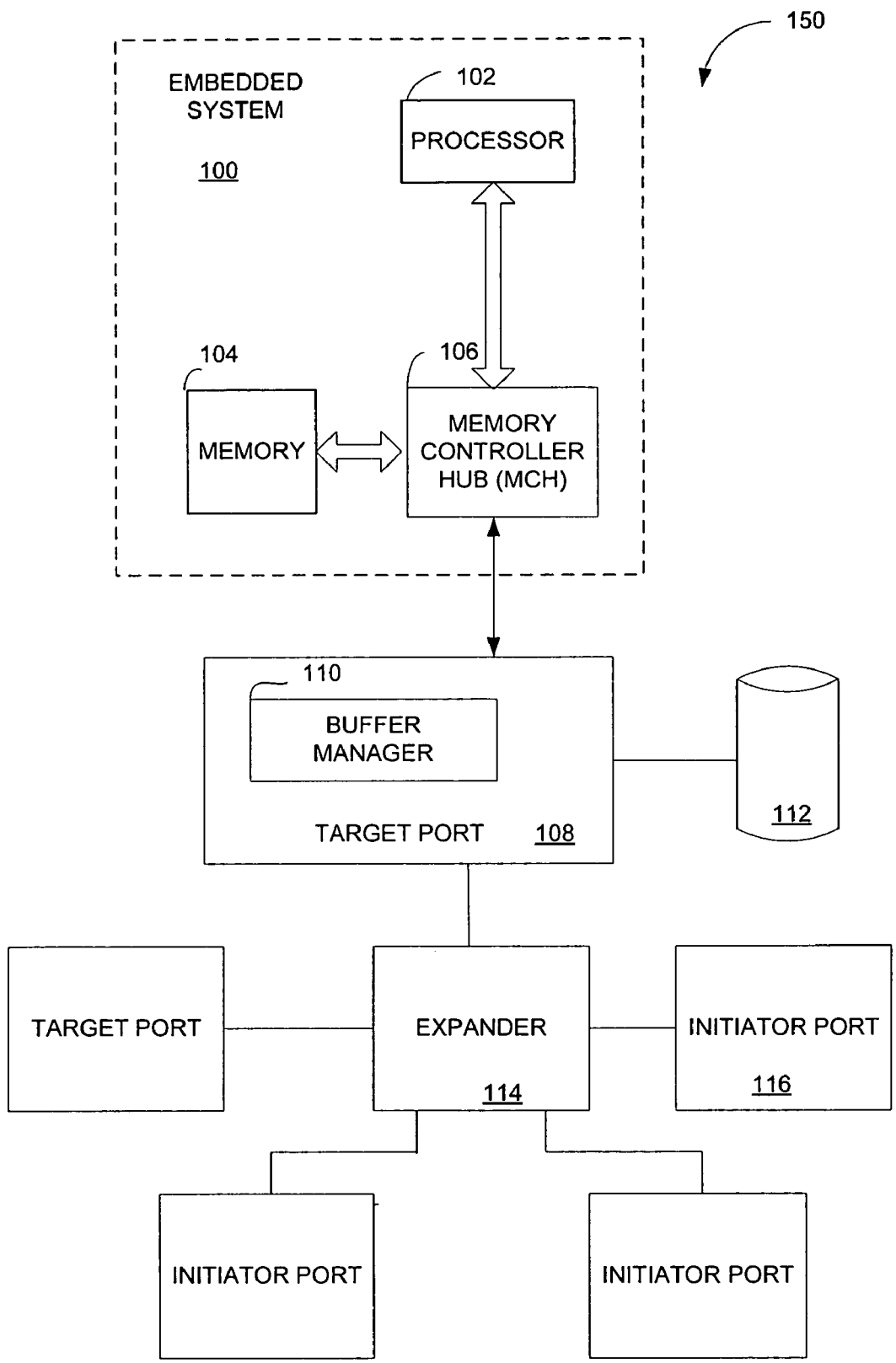
FIG. 1 is a block diagram of a system that includes initiator ports and target ports coupled through an expander.

FIG. 1 is a block diagram of a system 150 that includes a plurality of initiator ports 116 and target ports 108 coupled through an expander 114. The expander 114 facilitates communication between the ports 118, 116. Any of the initiator ports 116 may initiate a command for an I/O transfer to any of the target ports 108 that may result in an inbound data transfer to the target port 108 from the initiator port 116 or an outbound data transfer from the target port 108 to the initiator port 116.

The system 150 includes an embedded system 100 that includes a processor (Central Processing Unit (CPU)) 102, a memory 104 coupled to the processor 102 and a memory controller hub (MCH) 106 coupled to the memory 104. The processor 102 may be any one of a plurality of processors such as an Intel® Pentium IV® processor commercially available from the Assignee of the subject application.

A target port 108 is coupled to the MCH 106 and includes an embodiment of a buffer manager (buffer management unit) 110 that manages data buffers for use by I/O transfers to/from target devices from/to memory according to the principles of the present invention. For example, the buffer manager 110 may manage a pool of data buffers in memory 104 for use during data transfers between a client application in an initiator port 116 and a target device 112.

The target device 112 coupled to the target port 108 may be a storage device such as a disk drive, Digital Video Disk (DVD) drive, compact disk (CD) drive, Redundant Array of Independent Disks (RAID), or tape drive.

The SAS-SSP architecture defines four layers: phy, link, transport and application. The application layer defines Small Computer System Interface (SCSI), Advanced Technology Attachment (ATA) and management specific features. In the SCSI application layer, an initiator device creates SCSI commands and a target device processes the SCSI commands. The application client requests processing of a SCSI command by invoking SCSI transport services.

Figure 2:
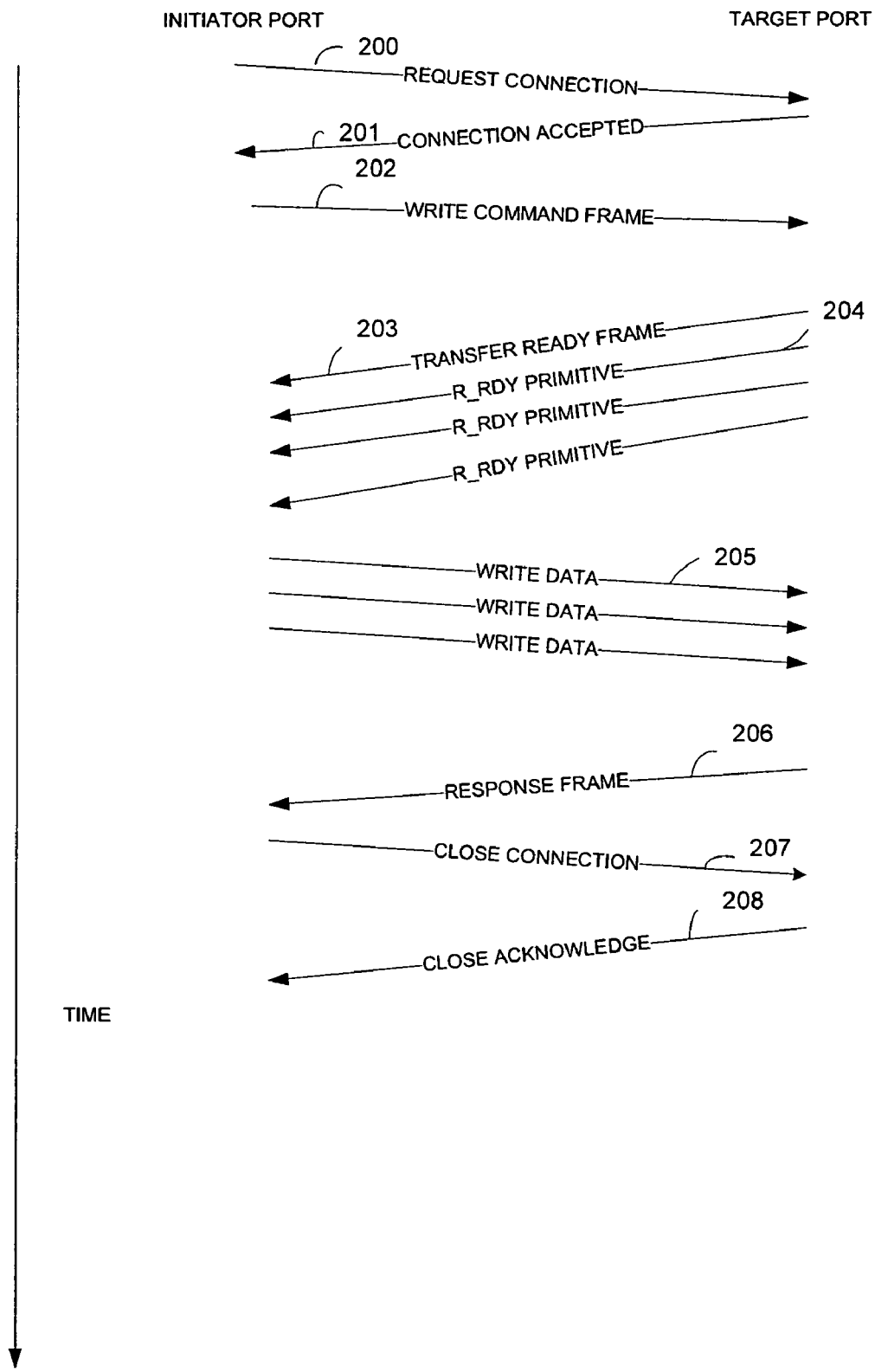
FIG. 2 is flow diagram for a command issued by the application layer to a target port from an initiator port that results in a target inbound data transfer.

FIG. 2 is flow diagram for a command issued by a SAS-SSP application layer in an initiator port 116 to a target port 108 that results in a target inbound data transfer. In a target inbound data transfer, data flows into the target port 108 from the initiator port 116.

At 200 in the flow diagram, the initiator port 116 issues a request for a connection to the target port 108. The target port 108 accepts the connection. After the connection is accepted, the initiator port 116 creates a write command frame and at 202, the initiator port 116 sends the write command frame to the target port 108. The write command frame includes the size of the I/O transfer.

Upon receiving the write command frame, the target port 108 processes the write command frame and may allocate memory resources for the write command based on the size of the data to be sent to the target port 108 for the write command. At 203, the target port 108 returns a transfer ready (XFER_RDY) frame to the initiator port 116 indicating how much data is to be sent by the initiator port 116 to the target port 108 based on a transfer count included in the received write command. The transfer count specified in the write command frame may be different than the transfer count returned in the XFER_RDY frame. In the embodiment shown, only one XFER_RDY frame is returned because the total transfer count specified in the write command is small. In other embodiments, there may be several XFER_RDY frames returned for a single write command dependent on the total transfer count specified in the write command.

The target port 108 controls the flow of data from the initiator port 116 through the use of credits which are sent to the initiator port 116 as one or more R_RDY primitives to indicate how much data the target port 108 can receive. One R_RDY primitive is sent per frame. After the initiator port 116 receives the XFER_RDY frame from the target port 108, it sends write data based on the credit it receives with the R_RDY primitive(s), and the data transfer count included in the XFER_RDY frame. At 204, the target port 108 sends a credit update (R_RDY primitive(s)) to the initiator port 116 to indicate how many frames that it is ready to receive.

When the data has been transferred with no error, at 206, the target port 108 may return a RESPONSE frame with good status to the initiator port 116 to complete the I/O transfer. The connection is closed upon receipt of a close acknowledge from the target port 108 at 208 in response to a close connection request sent to the target port 108 at 207 by the initiator port 116.

Referring to FIG. 1, in one embodiment, data buffers for storing write data prior to writing the write data to a storage device, are allocated in memory 104 by the buffer manager 110 in the target port 108. The buffer manager 110 manages the data buffers through the use of a scatter gather list (SGL). The SGL list is used to identify non-contiguous buffers in memory.

Figure 3:
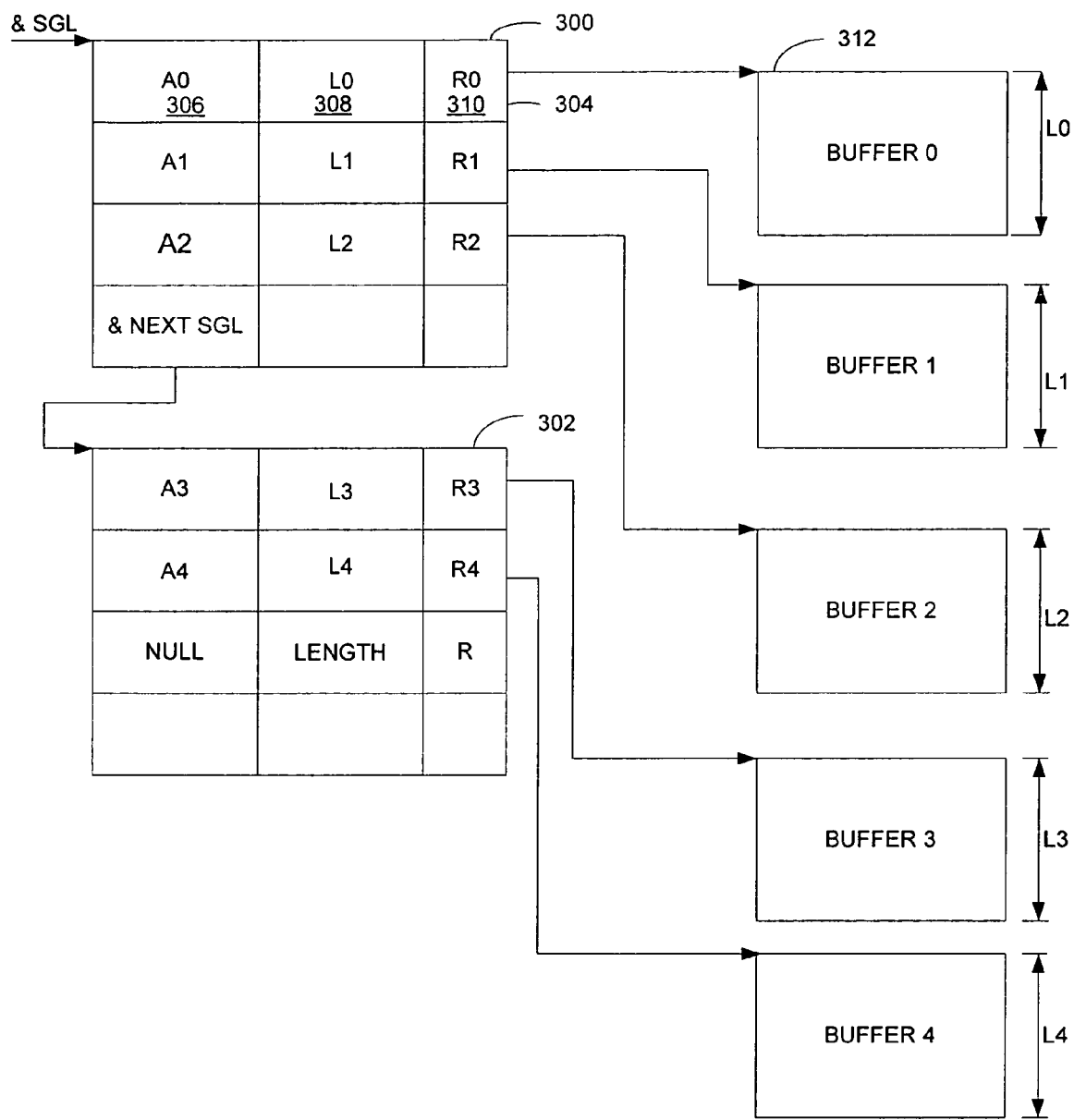
FIG. 3 is a block diagram illustrating a plurality of buffers in host or local memory defined by scatter gather list (SGL) entries in SGLs.

FIG. 3 is a block diagram illustrating a plurality of buffers in host or local memory defined by scatter gather list (SGL) entries in a SGL. A SGL includes a set of elements for storing data buffer address and length pairs (A/L pairs). A scatter gather segment is a memory data structure that stores a SGL.

In the embodiment shown in FIG. 3, there are two SGLs, one stored in a first SGL segment 300 and the other stored in a second SGL segment 302. The second SGL segment 302 is linked to the first SGL segment through a pointer (& next SGL) stored in the first SGL segment 300.

In an embodiment of the present invention, buffers allocated for an I/O transfer are defined by SGL segments 300, 302 that include a SGL having a plurality of SGL elements (entries) 304. Each SGL element 304 includes an address field 306 for storing a pointer to a start address of a data buffer and a length field 308 for storing a number of bytes in the data buffer. The SGL segment may be dynamically linked by the buffer manager 110 after the buffers associated with the current SGL segment 300 are filled (used) and another SGL segment 302 has been fetched from a pool of available SGL segments.

In addition to the address field and length field for storing an A/L pair, each element (entry) in the SGL segment includes a status field 310 which indicates whether the buffer associated with the SGL element 304 is ready to be transferred. The status field 310 allows partial data of an Input/Output (I/O) transfer (movement of data between data buffers in system memory and a device 112 (FIG. 1)) to be cut through between the initiator port 116 and the target port 108. Thus, the amount of memory resources required for an I/O transfer is reduced because data is cut through instead of storing all of the data for the I/O transfer prior to starting the I/O transfer.

In the embodiment shown, each SGL segment 300, 302 has three SGL elements. A NULL pointer stored in SGL segment 302 indicates that there are no other SGL segments allocated for the I/O transfer.

In an embodiment, a plurality of SGL segments 300, 302 are pre-allocated in memory and stored in a pool of SGL segments. A plurality of buffers 312 are also pre-allocated and stored in a pool of buffers. Upon receiving a request for an I/O transfer, the buffer manager 110 (FIG. 1) retrieves an SGL segment from the pool of SGL segments. In one embodiment the SGL segment has pre-allocated buffers. In another embodiment, the buffer manager 110 assigns allocated buffers to the SGL segment as required during the I/O transfer, that is, the buffers are allocated on demand instead of being pre-allocated prior to starting the I/O transfer. After a buffer is assigned, the start address and length of the assigned buffer is stored in a respective address/length pair in a SGL element.

The target port 108 sends R_RDY primitives to the initiator port 116 based on available buffers. For example, for a SAS-SSP I/O transfer, having a maximum frame size of 1 KB, four R_RDY primitives are sent after an SGL segment having four allocated 1 KB buffers is fetched from the SGL pool to indicate that there is sufficient memory available for storing four SAS frames.

In the embodiment in which buffers are pre-allocated to SGL segments, when all data buffers in the SGL segment have been filled, that is, are in use, another SGL segment 302 is fetched from the pool of SGL segments and linked to the current SGL segment. Credit may be updated when the SGL segment is retrieved based on the availability of buffers in the retrieved SGL segment 300. If there is no SGL segment available from the pool of SGL segments, the current I/O is suspended, the current states and status are saved, and I/O processing may be switched to another I/O which has available resources.

In another embodiment, buffers are allocated to SGL elements on demand. In addition to the pool of SGL segments, there is also a pool of buffers. An SGL segment is fetched from the SGL segment pool and buffers are fetched from the buffer pool on demand. A buffer is fetched from the buffer pool for an element 304 in the SGL segment 300 as data is being received by the target port 108. The target port 108 monitors both the SGL segment and data buffer availability to throttle incoming data via flow control protocols. The credits are sent via R_RDY primitives based on the availability of buffers that have been assigned to SGL segments. For example, if there are 4 buffers available but the SGL segment has only two entries available, the target port 108 can only send credit (R_RDYs) for two buffers due to the lack of SGL element resources, that is, credit is only sent for the buffers that are accessible through the SGL entries. Thus, flow control for SAS-SSP may be performed by monitoring available buffers and SGL segments.

In the target inbound case discussed in conjunction with FIG. 2, the target port 108 fetches an available SGL segment 300 from the SGL segment pool whenever it needs one, and an SGL segment is returned to the SGL segment pool whenever the SGL segment is no longer needed. After the target port 108 acquires an available SGL segment, it processes and transfers data based on the data buffer availability of that SGL segment.

Multiple I/Os may be processed concurrently because with on-demand memory allocation, there is no need for full allocation of memory resources for a particular I/O transfer prior to starting the respective I/O transfer. Thus, an I/O may start before all data buffers have been allocated for the I/O transfer. The data buffers are allocated as the I/O transfer is being processed allowing more efficient use of data buffers instead of storing the entire I/O in data buffers prior to starting the I/O transfer.

Each I/O transfer may allocate different memory resources. Therefore, the incoming data throttle is dependent on the I/O resources for the respective I/O transfers. For example, if there are multiple outstanding I/O transfers for the same remote node (target device 112); the minimum resources among the different I/O transfers may be used for flow control.

Outbound traffic from the target port 108 may be initiated by the initiator port 116. Outbound traffic may be sent to the initiator port 116 in response to a read command issued to the target port 108. For example, a read command may be invoked by the SCSI application layer for a SCSI INQUIRY or SCSI MODE SENSE command. After the target port 108 receives the read command, the target port 108 sends DATA frame(s) back to the initiator port 116. The sequence of frames is similar to the write command case discussed in conjunction with FIG. 2 with the exception of the transfer ready (XFER_RDY) frame because in contrast to the write command in which write data is sent to the target port 108, in the read command, read data is sent to the initiator port 116.

The initiator port 116 sends credit update(s) in the form of R_RDY primitive(s) to the target port 108 to indicate how many frames that it is ready to receive, with each R_RDY primitive transmitted indicating the initiator port 116 is ready to receive one frame. When the byte count in the read command is satisfied with no error, the target port 108 may return a RESPONSE frame to the initiator port 116 to complete the I/O transfer.

Similar methods may be used to manage I/O transfers in a resource limited environment for initiator inbound and outbound data transfers. In the initiator inbound case the initiator may use R_RDY credit update to throttle incoming data. In the initiator outbound case, the initiator may send data based on information received in the transfer ready (XFER_RDY) frame and received credits.

Figure 4:
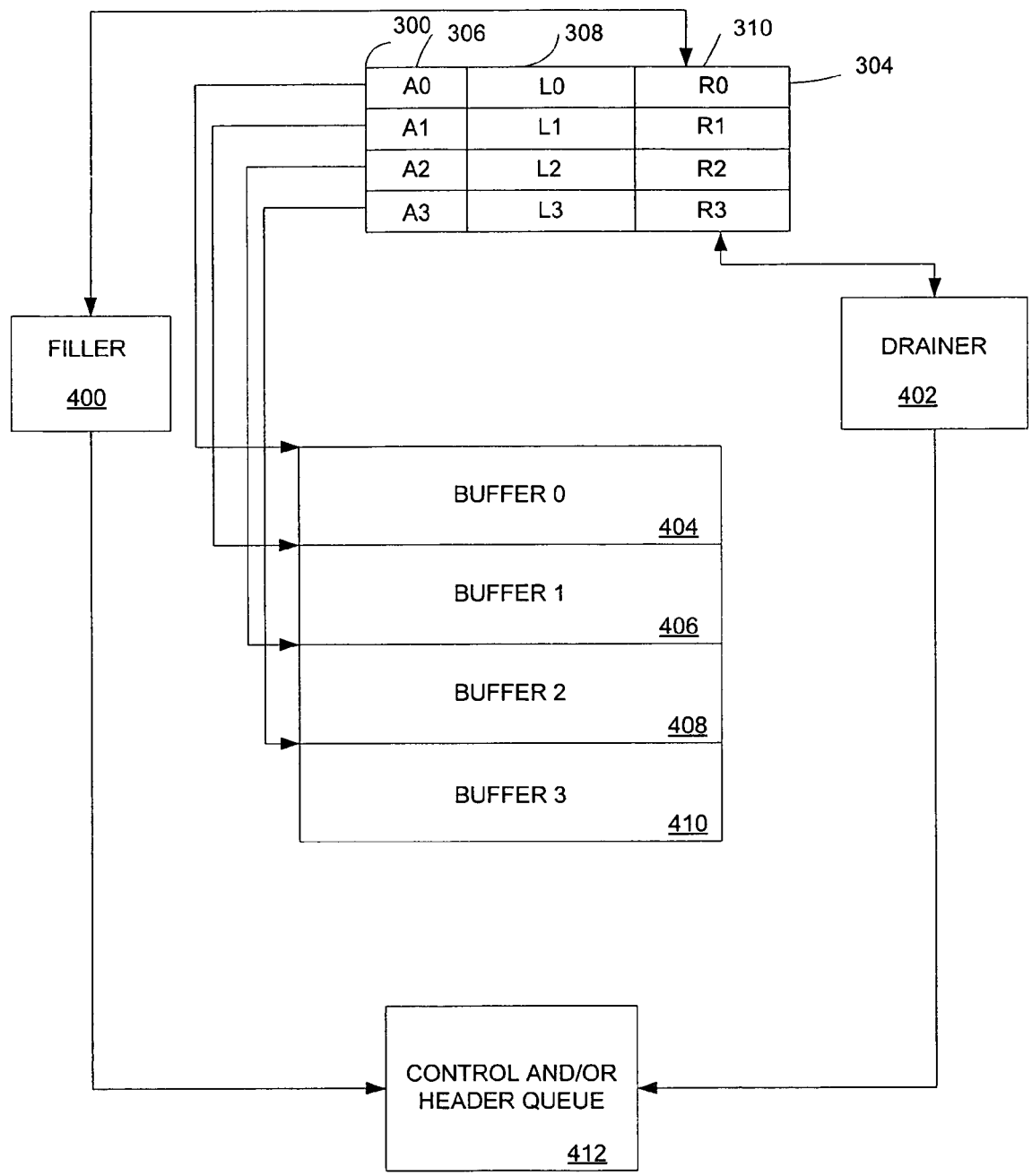
FIG. 4 is an embodiment of a SGL segment for storing a SGL in a limited resource environment.

FIG. 4 is an embodiment of a SGL segment for storing a SGL in a limited resource environment. Each SGL entry 304 in the SGL includes an address field and a length field for storing an A/L pair and a status field as discussed in conjunction with FIG. 3. In the embodiment shown, the status field 310 includes a ready indicator, that is, a single bit set to either logical '1' or logical '0'. In other embodiments, the ready indicator may have more than one bit and the status field may include other indicators.

As shown, there is a data transfer at the SAS-SSP application layer in progress between two applications 400, 402 one of which is designated an "A/L pair filler" application 400 and the other is designated an "A/L pair drainer" application 402. Both the A/L pair drainer application 402 and the A/L pair filler application 400 monitor the ready indicator in the SGL entry (element) 304. The drainer and the filler applications 402, 400 may also modify the ready indicator.

In an embodiment, the drainer and filler applications 402, 400 perform data operations for a SCSI write command issued by an initiator port 116 (FIG. 1) to a target device 112 through target port 108 (FIG. 1). The filler application 400 in the processor 102 (FIG. 1) or MCH 106 (FIG. 1) fills SGL entries 304 in memory 104 (FIG. 1) after data is removed from buffers in memory 104 (FIG. 1) and the drainer application 402 also in the target port 108 (FIG. 1) drains SGL entries after filling data into buffers in memory 104 (FIG. 1).

The SGL segment 300 has a plurality of buffers with each buffer associated with a particular SGL entry in the SGL segment 300. Thus, each buffer has an associated ready indicator in the SGL entry that is monitored by both the filler and the drainer applications 402, 400 to determine the status of the associated buffer.

In the embodiment shown, there are four pre-assigned buffers, one buffer assigned to each of the SGL elements in the SGL segment. Upon initialization, each ready indicator 310 associated with a buffer 404 is initialized to "available" or "not in use" state indicating that the respective buffer 404 is available for storing data for an I/O transfer.

After an "A/L pair" filler application 400 completes transferring the data stored in a data buffer, it sets the ready indicator 310 to "available" ("not in use") indicating that the buffer 404 is available to be used. In an embodiment in which the ready indicator 310 is one bit, the bit may be set to logical '1' to indicate "available" or "not in use" and cleared to logical '0' to indicate "not-available" or "in-use".

The A/L pair drainer application 402 monitors the ready indicator associated with one of the buffers. The A/L pair drainer application 402 may use a buffer when the ready indicator indicates that the buffer is "available". When the data buffer has been filled by the A/L pair drainer application, the A/L pair drainer application modifies the ready indicator to "in-use" indicating that the buffer is no longer available for use by the A/L pair drainer application. The A/L pair drainer application monitors the ready indicators in the SGL element 304 in the SGL in the SGL segment 300 associated with the next buffer and uses that buffer until it has been filled. If all buffers are filled, the A/R pair drainer application may monitor the ready indicators associated with the first buffer in the SGL segment 300 to determine when a buffer is available. The A/R pair drainer application 402 may start using the data buffer after the ready indictor field 310 is set to logical '1' indicating that the buffer is available.

Flow control between the A/L pair drainer application 402 and the A/L pair filler application 400 is performed by monitoring available SGL elements and their associated available data buffers. Control and header information may be sent by the drainer application 402 to the filler application 400 through a control and/or header queue 412.

Figure 5:
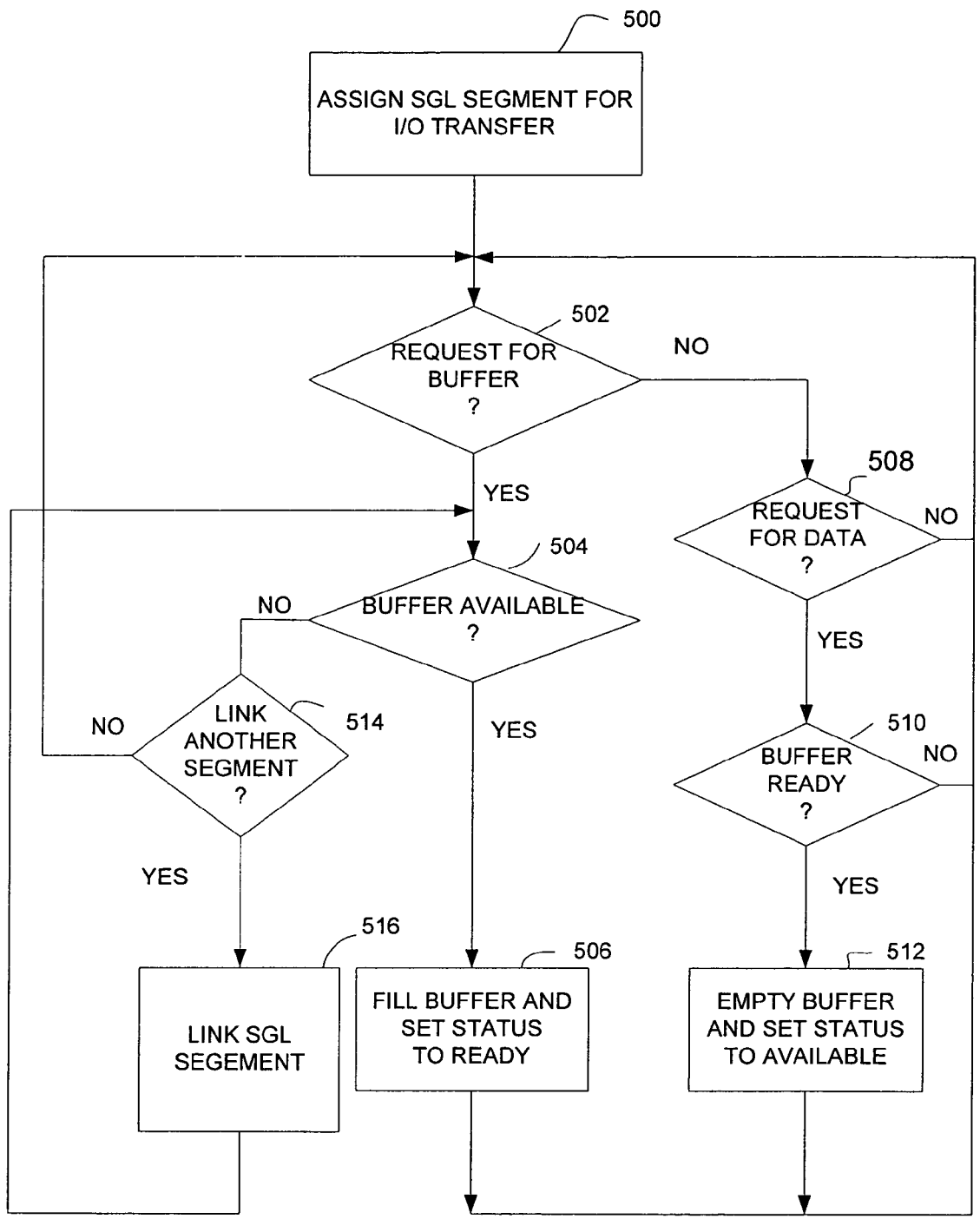
FIG. 5 is a flowchart illustrating an embodiment of a method for performing a target inbound Input/Output (I/O) transfer in a resource limited environment.

FIG. 5 is a flowchart illustrating an embodiment of a method for performing a target inbound I/O transfer in a resource limited environment. In the embodiment shown, an SGL segment has pre-allocated data buffers. FIG. 5 is described in conjunction with FIG. 3 and FIG. 4.

At block 500, an SGL segment 300 is assigned to the I/O transfer from a pool of SGL segments. As all data buffers have been pre-allocated to the SGL segment, the A/L pairs in each entry in the SGL segment include a pointer to the start of the pre-allocated buffer and the length of the pre-allocated data buffers. Each buffer pre-allocated to the SGL segment has its respective ready indicator set to "available" because the data buffer is not currently in use. Processing continues with block 502.

At block 502, if a drainer 402 requires a buffer, processing continues with block 504. If not, processing continues with block 508.

At block 504, the drainer 402 maintains an SGL pointer that initially points to the first entry (entry 0) in the SGL segment 300. A filler 400 also maintains a SGL pointer that initially points to the first entry (entry 0) in the SGL segment 300. In one embodiment with four entries labeled 0-3 in the SGL segment 300, the drainer 402 fills the buffers 404, 406, 408, 410 associated with the SGL entries 304 in order from entry 0 through entry 3. The SGL pointer for the drainer 402 points to the next entry in the SGL segment having a ready indicator set to "available". After the buffer associated with entry 3 has been filled, the SGL pointer for the drainer application points to entry 0. If the buffer associated with the entry in the SGL segment pointed to by the drainer 402 is available, processing continues with block 506. If not, processing continues with block 514.

At block 506, the ready indicator in the SGL element indicates that the buffer is "available" and the drainer 402 fills the data buffer in memory starting at the start address stored in the entry in the SGL segment 300 pointed to by the drainer SGL pointer. After the buffer has been filled, the state of the ready indicator in the entry in the SGL segment 300 is set to "unavailable" and the contents of the buffer can be read (emptied) by the filler 400. Processing continues with block 502.

At block 508, the filler 400 checks the status of the ready indicator in the entry in the SGL segment pointed to by the filler SGL pointer. Upon finding that the buffer associated with entry 0 has its ready indicator set to "unavailable" indicating that the buffer is "in-use", the filler 400 reads the data from (empties) the buffer. After the data has been read from the buffer, the filler 400 sets the ready indicator to "available". A subsequent search for an "unavailable" buffer starts at the next entry, in this case, at entry 1 with entries being processed in order from 0 to 3. In the case of a single SGL segment allocation, after the buffer associated with entry 3 has been emptied, the SGL entry pointer for the filler 400 points to entry 0. Processing continues with block 502.

At block 514, all the data buffers associated with the SGL segment are used so that the drainer 402 has no available resources to transfer I/O. Another SGL segment may be allocated from the SGL segment pool and dynamically linked to the current SGL segment. If another SGL segment is to be allocated, processing continues with 516. If not, processing continues with block 502 to wait for the buffer associated with entry 0 to become available.

At block 516, after all buffers in the SGL segment have been filled, instead of waiting for an available entry in the current SGL segment, the drainer application dynamically links another SGL segment to the current SGL segment to provide additional SGL entries for storing partial data to be transferred for the I/O transfer. The drainer 402 requests a SGL segment from the pool of SGL segments and links the allocated SGL segment to the current SGL segment by storing a pointer to the new SGL segment in the Next SGL field of the current SGL segment. The drainer 400 uses the first entry in the newly allocated SGL segment as the SGL entry pointer for the next request for a buffer.

The drainer 402 performs the linking of SGL segments as described in conjunction with FIG. 1. For SGL segments with pre-allocated buffers, the drainer 402 adds a link to the next SGL segment when the drainer 402 reaches the end of the list, that is, the last entry in the current SGL segment. For SGL segments in which each buffer is assigned to an entry when the entry is first accessed, the drainer 402 adds a link to another SGL segment when it assigns buffers to the last entry in the current SGL segment. Processing continues with block 504.

Memory resource management using SGL segment fetching, linking and data buffer filling reduces CPU processing requirements and thus provides better performance for I/O transfer. Data buffer utilization is improved through the use of a pool of SGL segments and a pool of data buffers. Memory requirements are reduced resulting in reducing power requirements due reducing data buffer requirements for an I/O transfer without reducing the I/O transfer performance.

An embodiment of the present invention may be used in a 'bridge' type application with limited resources due to the use of a 'data-cut-through' model in contrast to the traditional 'store-and-forward' model.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a set of scatter gather list elements associated with a data transfer operation between an initiator port and a target port, each element in the set of elements being in a scatter gather list in a host memory coupled to and accessible by both the target port and the initiator port, each element being to identify a data buffer to store partial data for the data transfer operation, the scatter gather list element identifying the data buffer by including in the element an address field to identify an address of the data buffer, a length field to store a length of the data buffer, and a status field to indicate a status of the data buffer; and
a buffer manager in the target port to allocate the data buffer in the host memory, to write the status in the status field, and to forward the partial data stored in the data buffer for the data transfer operation based on the status associated with the data buffer, the status field in the scatter gather list element being only a single status bit, the single status bit being to indicate whether the data buffer identified by the scatter gather list element is ready to be transferred between the initiator port and the target port by being set to a respective bit value selected from two possible bit values, one of the two possible values indicating that the data buffer identified by the scatter gather list element is not in use and available for use by a drainer application, the other of the two possible values indicating that the data buffer identified by the scatter gather list is in use and unavailable for use by the drainer application, the initiator port and the target port being coupled to an embedded system, the embedded system including the host memory, the drainer application being in the target port, the drainer application both to drain the scatter gather list element and to modify the status bit to indicate that the data buffer is unavailable for use by the drainer application after the drainer application fills the partial data into the data buffer, the embedded system also including a filler application both to fill the scatter gather list element and to set the status bit to indicate that the data buffer is available for use by the drainer application after the filler application completes transferring from the data buffer the partial data stored in the data buffer, both the drainer application and the filler application also to monitor the status bit to determine status of the data buffer.

2. The apparatus of claim 1, further comprising:
a next set of elements, the buffer manger being to link the next set of elements to the set of elements upon detecting all data buffers associated with the scatter gather list are used, the next set of elements being in another scatter gather list.

3. The apparatus of claim 1, wherein:
the filler application is in one of a memory controller and a processor in the embedded system.

4. The apparatus of claim 1, wherein the data transfer operation is an Input/Output transfer operation.

5. The apparatus of claim 1, wherein the set of elements is allocated from a pool of sets of elements.

6. The apparatus of claim 1, wherein each element in the set of elements has a pre-allocated data buffer.

7. The apparatus of claim 1, wherein a data buffer is assigned as needed from a pool of data buffers to each element in the set of elements.

8. A method comprising:
assigning a set of scatter gather list elements to a data transfer operation between an initiator port and a target port;
identifying a data buffer for storing partial data for the data transfer operation in one of the scatter gather list elements, the scatter gather list element identifying the data buffer by including in the element an address field to identify an address of the data buffer, a length field to store a length of the data buffer, and a status field to indicate a status of the data buffer, the element being in a scatter gather list in a host memory coupled to and accessible by both the target port and the initiator port; and
forwarding by a buffer manager in the target port the partial data stored in the data buffer for the data transfer operation based on the status associated with the data buffer, the buffer manager also being to allocate the data buffer in the host memory and to write the status in the status field, the status indicating whether the data buffer is ready to be transferred between the initiator port and the target port, the status field in the scatter gather list element being only a single status bit, the single status bit being to indicate whether the data buffer identified by the scatter gather list element is ready to be transferred between the initiator port and the target port by being set to a respective bit value selected from two possible bit values, one of the two possible values indicating that the data buffer identified by the scatter gather list element is not in use and available for us by a drainer application, the other of the two possible values indicating that the data buffer identified by the scatter gather list element is in use and unavailable for use by the drainer application, the initiator port and the target port being coupled to an embedded system, the embedded system including the host memory, the drainer application being in the target port, the drainer application both to drain the scatter gather list element and to modify the status bit to indicate that the data buffer is unavailable for use by the drainer application after the drainer application fills the partial data into the data buffer, the embedded system also including a filler application both to fill the scatter gather list element and to set the status bit to indicate that the data buffer is available for use by the drainer application after the filler application completes transferring from the data buffer the partial data stored in the data buffer, both the drainer application and the filler application also to monitor the status bit to determine status of the data buffer.

9. The method of claim 8, further comprising:
upon detecting that all data buffers associated with the scatter gather list are used, linking another set of elements to the set of elements, the another set of elements being in another scatter gather list.

10. The method of claim 8, wherein:
the filler application is in one of a memory controller and a processor in the embedded system.

11. The method of claim 8, wherein the data transfer operation is an Input/Output transfer operation.

12. The method of claim 8, wherein a set of elements is allocated from a pool of SGL segments.

13. The method of claim 8, wherein each element in the set of elements has a pre-allocated data buffer.

14. The method of claim 8, wherein data buffers are assigned as needed to each element in the set of elements from a pool of data buffers.

15. An article including a machine-accessible medium having associated information, wherein the information, when accessed, results in a machine performing:
storing a set of scatter gather list elements associated with a data transfer operation between an initiator port and a target port;
identifying a data buffer for storing partial data for the data transfer operation in one of the scatter gather list elements, the scatter gather list element identifying the data buffer by including in the element an address field to identify an address of the data buffer, a length field to store a length of the data buffer, and a status field to indicate a status of the data buffer, the element being in a scatter gather list in a host memory coupled to and accessible by both the target port and the initiator port; and
forwarding by a buffer manager in the target port the partial data stored in the data buffer for the data transfer operation based on the status associated with the data buffer, the buffer manager also being to allocate the data buffer in the host memory and to write the status in the status field, the status field in the scatter gather list element being only a single status bit, the single status bit being to indicate whether the data buffer is ready to be transferred between the initiator port and the target port by being set to a respective bit value selected from two possible bit values, one of the two possible values indicating that the data buffer identified by the scatter gather list element is not in use and available for use by a drainer application, the other of the two possible values indicating that the data buffer identified by the scatter gather list is in use and unavailable for use by the drainer application, the initiator port and the target port being coupled to an embedded system, the embedded system including the host memory, the drainer application being in the target port, the drainer application both to drain the scatter gather list element and to modify the status bit to indicate that the data buffer is unavailable for use by the drainer application after the drainer application fills the partial data into the data buffer, the embedded system also including a filler application both to fill the scatter gather list element and to set the status bit to indicate that the data buffer is available for use by the drainer application after the filler application completes transferring from the data buffer the partial data stored in the data buffer, both the drainer application and the filler application also to monitor the status bit to determine status of the data buffer.

16. The article of claim 15, further comprising:
upon detecting that all data buffers associated with the scatter gather list are used, linking another set of elements to the set of elements, the another set of elements being in another scatter gather list.

17. A system comprising:
a disk drive; and
a scatter gather segment in a scatter gather list to store a plurality of scatter gather list elements associated with a data transfer operation between an initiator port and a target port coupled to the disk drive, a scatter gather list element in the scatter gather segment being to identify a data buffer to store partial data for the data transfer operation, the scatter gather list element identifying the data buffer by including in the scatter gather list element an address field to identify an address of the data buffer, a length field to store a length of the data buffer, and a status field to indicate a status of the data buffer, the scatter gather list being in host memory coupled to and accessible by both the target port and the initiator port; and
a buffer manager in the target port to allocate the data buffer in the host memory, to write the status in the status field, and to forward the partial data stored in the data buffer for the data transfer operation based on the status associated with the data buffer, the status field in the scatter gather list element being only a single status bit, the single status bit being to indicate whether the data buffer identified by the scatter gather list element is ready to be transferred between the initiator port and the target port by being set to a respective bit value selected from two possible bit values, one of the two possible values indicating that the data buffer identified by the scatter gather list element is not in use and available for use by a drainer application, the other of the two possible values indicating that the data buffer identified by the scatter gather list element is in use and unavailable for use by the drainer application, the initiator port and the target port being coupled to an embedded system, the embedded system including the host memory, the drainer application being in the target port, the drainer application both to drain the scatter gather list element and to modify the status bit to indicate that the data buffer is unavailable for use by the drainer application after the drainer application fills the partial data into the data buffer, the embedded system also including a filler application both to fill the scatter gather list element and to set the status bit to indicate that the data buffer is available for use by the drainer application after the filler application completes transferring from the data buffer the partial data stored in the data buffer, both the drainer application and the filler application also to monitor the status bit to determine status of the data buffer.

18. The system of claim 17, further comprising:
a next scatter gather element, the buffer manger being to link the next scatter gather element to the scatter gather list upon detecting all data buffers associated with the scatter gather list are used, the next scatter gather element being in another scatter gather list.

* * * * *